Dec. 14, 1926.
M. F. HINTZE
1,610,284
TRANSMISSION MECHANISM
Filed Sept. 30, 1925　　2 Sheets-Sheet 1
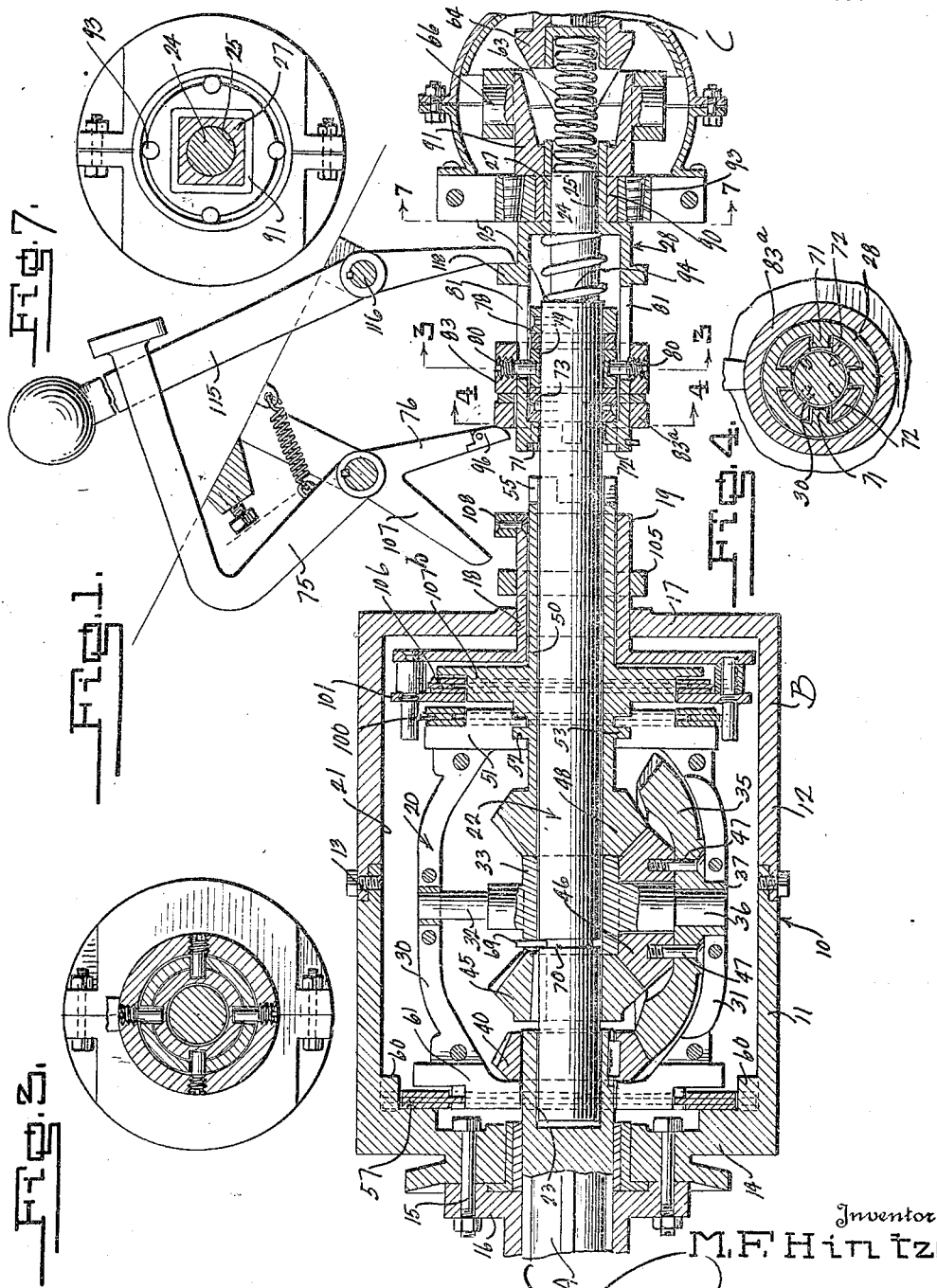
Inventor
M. F. Hintze
By Lancaster & Allwine
Attorneys

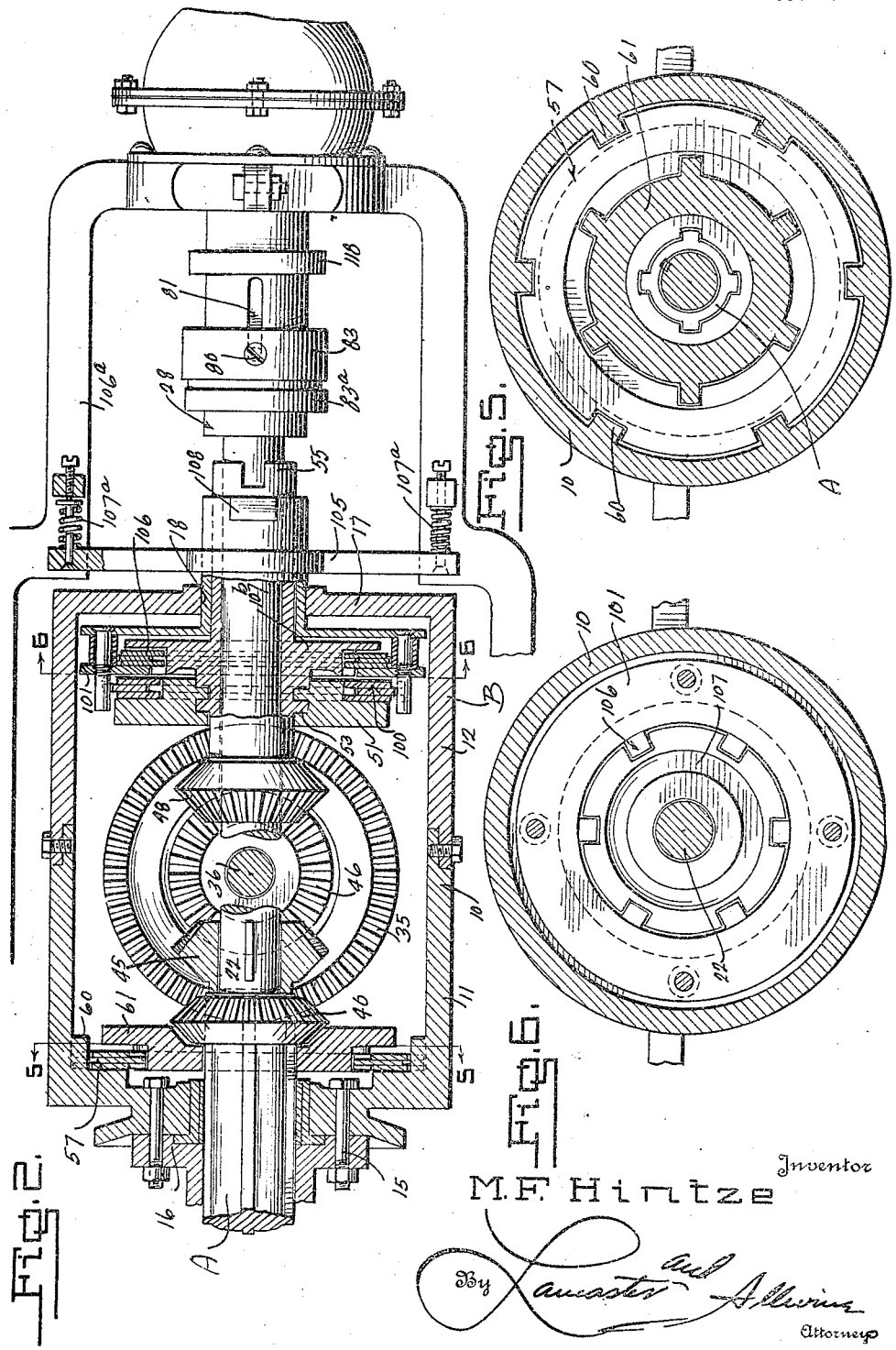

Patented Dec. 14, 1926.

1,610,284

UNITED STATES PATENT OFFICE.

MAUARII FERDINAND HINTZE, OF PAPEITI, TAHITI, SOCIETY ISLANDS, ASSIGNOR OF ONE-FOURTH TO WM. J. MURRAY, OF ALAMEDA, CALIFORNIA, AND ONE-HALF TO CHARLES H. MINTO, OF SAN FRANCISCO, CALIFORNIA.

TRANSMISSION MECHANISM.

Application filed September 30, 1925. Serial No. 59,715.

This invention relates to improvements in transmission mechanisms, such as is set forth in my co-pending application, Serial No. 59,398, filed Sept. 29, 1925, and embodying specific improvements thereover in the simplified means for driving a controlling gear from the crank shaft or drive shaft.

The primary object of this invention is the provision of a transmission mechanism embodying a novel simplified type of gearing, operating on the planetary and differential principle, for efficiently driving a driven shaft at low, intermediate, or high speeds.

Other objects and advantages of this invention will be apparent during the course of the following detailed description.

In the accompanying drawings, forming a part of this specification, and wherein similar reference characters designate corresponding parts throughout the several views, Figure 1 is a longitudinal cross sectional view taken thru the improved transmission mechanism, showing operating and control features thereof.

Figure 2 is a longitudinal sectional view thru the improved transmission mechanism, on a plane at right angles to the view illustrated in Figure 1, and showing operating features of the transmission mechanism.

Figures 3 and 4 are cross sectional views taken substantially on their respective lines in Figure 1 of the drawings.

Figures 5 and 6 are transverse sectional views taken substantially on their respective lines in Figure 2 of the drawings.

Figure 7 is a transverse sectional view taken substantially on its respective lines in Figure 1 of the drawings.

In the drawings, wherein for the purpose of illustration is shown only a preferred embodiment of this invention, the letter A may generally designate a drive shaft, to which improved transmission mechanism B is cooperatively connected for drive of the driven shaft C.

The transmission mechanism B preferably includes a housing 10, comprising the half-pocketed sections 11 and 12, connected by an overlapping joint 13. The section 11 includes an end wall 14, which is bolted or connected by appropriate means 15 to a fly wheel or analogous structure 16 which is keyed to the drive shaft A. The other housing portion 12 includes an end wall 17 having an opening 18 therein, thru which a clutch sleeve 19 is slidable, in accordance with features of the invention set forth in my co-pending application above referred to. A longitudinally shiftable frame 20 is provided within the compartment 21 of the housing 10, which comprises a pair of half sections adapted to separate on a plane which intersects the axis of the counter shaft 22, which is rotatably mounted in alignment with the drive and driven shafts. The counter shaft 22 has one end thereof bearing in a pocket 23 provided inwardly of the end of the drive shaft A, which faces in the housing compartment 21, and the opposite end of the counter shaft 22 is reduced at 24, and rotatably bears in a passageway 25 of a polygonal shank portion 27, of a shifting sleeve 28. The frame 20 includes the longitudinally extending space arms 30 and 31 in spaced relation at opposite sides of the counter shaft 22, which support a diametrically disposed spider 32, having a hub or sleeve 33 which bears in rotatable relation about the counter shaft 22, as illustrated in Figure 1. A cup-shaped control gear 35 rotatably bears on the spindle extension 36 of the spider 32, and has a hub portion 37 which also bears in the arm 31 of the frame 20. This control gear 35 is thus located on an axis radially disposed at right angles with respect to the axis of the counter shaft 22, and is bodily offset to one side of said counter shaft 22, and it is of course disposed in the compartment 21 of the housing 10. This gear 35 is in meshing relation for drive by means of a bevel gear 40, which may be splined on the end of the drive shaft A which extends into the housing compartment 21, as illustrated in Figure 1.

The counter shaft 22 has a bevel gear 45 keyed thereon, at one side of the spider hub 33, in meshing relation with a bevel gear 46, of about the same size, which is bolted, or otherwise fixedly attached at 47 with the control gear 35; the said gear 46 preferably having the spider arm extending therethrough, for centering purposes, although such is not necessary.

At the opposite side of the spider hub 33 from the gear 45 is a bevel gear 48, which may be termed a reversing gear, and which is in meshing relation with the gear 46 which is keyed to the control gear 35.

The reversing gear 48 has a sleeve 50 rigid therewith, which extends longitudinally along the counter shaft 22, and in fact the counter shaft 22 bears in this sleeve. This sleeve 50 is rotatable with respect to the frame 20, but is not shiftable therealong, incident to the fact that the frame 20 at one end thereof has a disc portion 51, with an annular groove 52, within which an annular flange 53 of the sleeve 50 bears. The sleeve 50 extends externally of the housing wall 17, and at its rear end is provided with the clutching teeth 55.

A direct drive clutch 57 is employed in cooperation with the frame 20 and the wall portion 14 of the housing 10, having certain plates thereof keyed at 60 with the housing 10, adjacent the wall portion 14, and other intermediate plates keyed with the disc end 61 of the frame 20, in accordance with dry plate clutch construction.

Under normal circumstances a compression spring 63 is located adjacent the driven shaft C, abutting against a part 64 of the universal joint structure 66, and engaging against the reduced end 24 of the counter shaft 22, to force the latter longitudinally with respect to the housing 10 in the direction of the drive shaft A. Due to the fact that the frame 20 is connected with the counter shaft 22 for longitudinal movement, incident to the provision of a pin 69 operating in a groove 70 of the counter shaft 22, the frame will be moved to force the clutch 57 into connected engagement with the housing 10, in order to effect drive of the counter shaft at drive shaft speed.

The means for operating the various speeds of the transmission mechanism includes the shifting sleeve 28 above mentioned, which has clutching teeth 71 thereon inwardly at an end thereof adapted for intermeshing relation with either the teeth 55 of the reversing gear sleeve 50, or the teeth 72 of a collar 73 which is keyed on the counter shaft 22. Thus, the shifting sleeve 28 may be keyed for rotation either with the counter shaft 22 or with the reversing gear sleeve 50, or the teeth 71 may assume an intermediate position out of meshing relation with the teeth 55 or 72.

As set forth in my co-pending application above referred to, means is provided for shifting the counter shaft 22, and this means includes an operating pedal or lever 75, having an operating finger or arm 76. The counter shaft 22 in addition to the keyed collar 73 is also provided with a second spaced collar 78 keyed thereto, between which is provided a collar 79 rotatable upon the counter shaft, but is held by the collars 73 and 78 against longitudinal movement upon said counter shaft. This collar 79 is provided with radial pins 80 extending through opposed longitudinal slots 81 of the shifting sleeve 28, and exteriorly of said shifting sleeve being detachably connected in a shiftable collar or ring 83, which engages exteriorly about the sliding sleeve 28, in sliding relation therewith. Upon the shifting sleeve 28 is mounted a pedal arm engaging ring 83ª, rotatable on the shifting sleeve and adapted for cooperation, during the shifting force which is applied by the pedal, against the ring 83.

The shifting sleeve 28 is provided with a polygonal shaped shank 27, as above mentioned, which is slidably supported in a polygonal opening of a bearing hub 90 of a part 91 of the universal joint 66, which is universally connected to the part 64 above mentioned. This joint part 91 may be supported by an anti-friction bearing 93 in any approved manner. A spring 94 is provided within the shifting sleeve 28, engaging against a shoulder 95 on the counter shaft, at one end, and at its opposite end engaging against an end wall of the shifting sleeve, to normally force the shifting sleeve longitudinally towards the universal joint, into position to clutch the teeth 71 and 72 of the sleeve 28 and counter shaft, in the relation illustrated in Figure 1 of the drawings.

To effect a neutral location of the transmission parts it is merely necessary for an operator to depress the pedal 75, so that the pivoted end 96 of the pedal arm 76 engages against the ring 83ª, which forces the ring 83 and consequently the counter shaft 22 longitudinally of the transmission housing, to disengage the clutch 57, thus disconnecting the counter shaft 22 from the drive shaft and permitting the frame 20 merely to rotate about the then stationary gear 45.

In order to effect low speed drive, a clutch 100 is provided for cooperation in clutching the frame 20 with a stationary ring 101; the stationary 101 being held against rotation about the counter shaft, but being shiftable therealong, by reason of its attachment to the clutch sleeve 19. This sleeve 19 is held against rotation by means of a frame 105, slidably carried upon the vehicle chassis 106ª, by resilient springs 107ª, described in my copending application above referred to. It is apparent that the springs 107ª normally urge the clutch sleeve 19 towards the drive shaft, so that upon shifting of the frame 20 longitudinally of the counter shaft in the direction of the driven shaft, the plates of the clutch 100 may be thrown into clutching engagement, for clutching the frame 20 against the stationary disc 100, in order to stop rotation of the frame 20. This longitudinal movement of the frame 20 is accomplished by further depression of the pedal 75 from its neutral location, which causes the arm 76 to operate against the ring 83ᵃ, to further shift the counter shaft 22 in the direction of the driven shaft, in order to close the clutch 100 to effect the function above described. Thus, by stopping of the frame 20, it is prevented from rotating about the gear 45, and due to the fact that the gear 46 must rotate by reason of its connection with the crank shaft, the gear 45 will thus be caused to rotate, and consequently rotate the counter shaft, and due to the connected engagement of the counter shaft with the shifting sleeve 28, the latter will cause the universal joint and consequently the driven shaft C to rotate at low speed. The transmission mechanism includes a clutch 106, at the opposite side of the ring 101, from the clutch 100, which is adapted for cooperation between said ring 101 and the annular flange 107ᵇ of the reversing sleeve 50. To effect second speed drive the operator merely depresses the lever or pedal 75, and a second arm 107 carried thereby is positioned for engagement with an abutment 108 of the clutch sleeve 19, to enable the longitudinal movement of the clutch sleeve, and thus force the clutch 106 into connected engagement with the reversing gear sleeve flange 107ᵇ, to hold the reversing gear sleeve stationary, and thus the reversing gear 48 stationary, and it can readily be understood that in addition to first speed drive the frame 20 will be caused to rotate incident to meshing of the gears 46 and 48 to augment the speed, and accomplish second speed drive of the transmission mechanism.

Reverse drive of the transmission mechanism contemplates the provision of a lever 115, pivoted at 116, and the function of which is to cooperate against an annular flange 118 of the shifting sleeve 28, to cause the latter to move longitudinally of the counter shaft to mesh the teeth 71 thereof with the teeth 55 of the reversing gear sleeve 50, so that it can readily be understood that under these circumstances the gear 48 is connected with the universal joint 66, through the intermediary of the shifting sleeve 28. When the above has been accomplished, the operator depresses the pedal 75 into low speed position, and it can readily be understood that in this position the gear 46 will drive the reversing gear 48, and although the gear 45 is also driven, the counter shaft 22 merely idles, for it is not connected with the shifting sleeve 28 during such drive.

The clutches 57, 100 and 106 are preferably of the dry plate type, with alternate plates connected to the drive part of the clutch, and the remaining plates keyed or connected in slidable relation to the driven part of the clutch, and in accordance with dry plate construction, and as has been illustrated in Figures 5 and 6 of the drawings, designating the keying arrangement of the clutch plates.

From the foregoing description of this invention it is apparent that a novel type of transmission mechanism has been provided, the speed shifting of which may be efficiently accomplished in pratically noiseless manner, due to the planetary gearing, and the details of which are compactly arranged, by reason of the planetary and differential movements of the connected gears.

The part A of this invention instead of being the drive shaft itself, may be a shaft feathered on the drive shaft, and in this instance the part A would have the gear 40 keyed thereto against sliding.

Various changes in the shape, size, and arrangement of parts may be made to the form of invention herein shown and described, without departing from the spirit of the invention or the scope of the claims.

I claim:

1. In a transmission mechanism the combination of a drive shaft, a counter shaft, a frame independently rotatable on the counter shaft, bevel gear means rotatable in the frame on an axis arranged at right angles to the axis of the counter shaft, bevel gear means carried by the drive shaft in meshing relation with the first mentioned bevel gear means for drive of the same, and a pair of bevel gears carried by the counter shaft one of the same having a connection with the counter shaft for rotation therewith and in engagement with the first mentioned bevel gear means at one side of its axis of rotation and the other of said pair of said bevel gears being independently rotatable on the counter shaft and in meshing relation with the first mentioned bevel gear means at its opposite side of axis of rotation.

2. In a transmission mechanism the combination of a drive shaft, a counter shaft, a frame independently rotatable on the counter shaft, bevel gear means rotatable in the frame on an axis arranged at right angles to the axis of the counter shaft, bevel gear means carried by the drive shaft in meshing relation with the first mentioned bevel gear means for drive of the same, a pair of bevel gears carried by the counter shaft one of the same being keyed to the counter shaft and in engagement with the first mentioned bevel gear means at one side of its axis of rotation and the other of said pair of said bevel gears being independently rotatable on the counter shaft and in meshing relation with the first mentioned bevel gear means at its opposite side of axis of rotation, means for connecting said frame for direct drive with said drive shaft, means for releasably holding the frame stationary against any rotation, and means for holding said bevel gear which is independently rotatable on the counter shaft in stationary relation.

3. In a transmission mechanism the combination of a drive shaft, a counter shaft, a frame independently rotatable on the counter shaft, bevel gear means rotatable in the frame on an axis arranged at right angles to the axis of the counter shaft, bevel gear means carried by the drive shaft in meshing relation with the first mentioned bevel gear means for drive of the same, a pair of bevel gears carried by the counter shaft one of the same beng keyed to the counter shaft and in engagement with the first mentioned bevel gear means at one side of its axis of rotation and the other of said pair of said bevel gears being independently rotatable on the counter shaft and in meshing relation with the first mentioned bevel gear means at its opposite side of axis of rotation, means for connecting said frame for direct drive with said drive shaft, means for releasably holding the frame stationary against any rotation, means for holding said bevel gear which is independently rotatable on the counter shaft in stationary relation, a driven shaft, and means for selectively keying the driven shaft with the counter shaft or the gear which is independently rotatable on said counter shaft.

4. In a transmission mechanism the combination of a drive shaft, a counter shaft independently rotatable with respect to the drive shaft, a frame independently rotatable upon said counter shaft including an arm, a relatively large bevel gear rotatably mounted in said frame on said arm in a plane of rotation on the arm entirely laterally of the counter shaft, a bevel gear having a connection with the drive shaft and being in meshing relation with said first mentioned bevel gear, a smaller bevel gear rigidly connected with the first mentioned bevel gear for rotation therewith, a bevel gear having a connection with the counter shaft and being in meshing relation with the said smaller bevel gear at one side of the axis of rotation of said smaller bevel gear, and a bevel gear independently rotatable on the counter shaft in meshing relation with the smaller bevel gear at the opposite side of its axis of rotation with respect to that bevel gear which has connection with the counter shaft.

5. In a transmission mechanism the combination of a drive shaft, a counter shaft independently rotatable with respect to the drive shaft, a frame independently rotatable upon said counter shaft, said frame including a radial arm disposed substantially at right angles to the axis of the counter shaft, a relatively large bevel gear rotatably mounted in said frame on said arm in a plane of rotation on the arm entirely laterally of the counter shaft, a bevel gear keyed on the drive shaft in meshing relation with said first mentioned bevel gear, a smaller bevel gear rigidly connected with the first mentioned bevel gear for rotation therewith, a bevel gear keyed on the counter shaft in meshing relation with the said smaller bevel gear at one side of the axis of rotation of said smaller bevel gear, a bevel gear independently rotatable on the counter shaft in meshing relation with the smaller bevel gear at the opposite side of its axis of rotation with respect to that bevel gear which is keyed to the counter shaft, means for releasably connecting the frame to the drive shaft for rotation therewith, means for releasably holding the frame stationary against rotation, and means for releasably holding said gear stationary which is independently rotatable on said counter shaft.

6. In a transmission mechanism the combination of a drive shaft, a counter shaft independently rotatable with respect to the drive shaft, a frame independently rotatable upon said counter shaft, said frame including a radial arm disposed substantially at right angles to the axis of the counter shaft, a relatively large bevel gear rotatably mounted in said frame on said arm for a plane of rotation on the arm entirely laterally of the counter shaft, a bevel gear splined on the drive shaft in meshing relation with said first mentioned bevel gear, a smaller bevel gear rigidly connected with the first mentioned bevel gear for rotation therewith, a bevel gear keyed on the counter shaft in meshing relation with the said smaller bevel gear at one side of the axis of rotation of said smaller bevel gear, a bevel gear independently rotatable on the counter shaft in meshing relation with the smaller bevel gear at the opposite side of its axis of rotation with respect to that bevel gear which is keyed to the counter shaft, means for releasably connecting the frame to the drive shaft for rotation therewith, means for releasably holding the frame stationary against rotation, means for releasably holding said gear stationary which is independently rotatable on said counter shaft, a driven shaft, and means for selectively connecting said driven shaft with either the counter shaft or said gear which is independently rotatable on the counter shaft.

7. In a transmission mechanism the combination of a drive shaft, a second shaft, a frame independently rotatable with respect to said shaft, gear means rotatable upon the frame on an axis arranged transversely of the axis of the second shaft, a gear connected with the drive shaft in meshing relation with said gear means for drive of the latter, a pair of gears carried by the second shaft, one of the same having a connection with the shaft for rotation therewith and a driven engagement with the first mentioned gear means at one side of the axis of rotation of the gear means and the other of said pair of gears being independently rotatable with respect to the second shaft and in driven engagement with the gear means at the opposite side of the axis of rotation thereof, means to releasably hold the frame stationary against rotation, and means to releasably hold that gear of the pair of gears which is independently rotatable on the second shaft in a stationary relation to permit the gear means to rotate thereabout.

MAUARII FERDINAND HINTZE.